US010797955B2

United States Patent
Lessmann

(10) Patent No.: US 10,797,955 B2
(45) Date of Patent: Oct. 6, 2020

(54) SYSTEM AND METHOD FOR OPERATING A NETWORK

(71) Applicant: NEC Laboratories Europe GmbH, Heidelberg (DE)

(72) Inventor: Johannes Lessmann, Gummersbach (DE)

(73) Assignee: NEC CORPORATION, Tokyo (JP)

( * ) Notice: Subject to any disclaimer, the term of this patent is extended or adjusted under 35 U.S.C. 154(b) by 140 days.

(21) Appl. No.: 16/068,142

(22) PCT Filed: Jan. 8, 2016

(86) PCT No.: PCT/EP2016/050293
§ 371 (c)(1),
(2) Date: Jul. 5, 2018

(87) PCT Pub. No.: WO2017/118488
PCT Pub. Date: Jul. 13, 2017

(65) Prior Publication Data
US 2019/0014005 A1 Jan. 10, 2019

(51) Int. Cl.
H04L 12/00 (2006.01)
H04L 12/24 (2006.01)
(Continued)

(52) U.S. Cl.
CPC .......... *H04L 41/0893* (2013.01); *H04L 41/12* (2013.01); *H04L 41/5054* (2013.01);
(Continued)

(58) Field of Classification Search
CPC ... H04L 43/08; H04L 69/321; H04L 41/0893; H04L 41/5054; H04L 41/12;
(Continued)

(56) References Cited

U.S. PATENT DOCUMENTS 5,860,006 A * 1/1999 Osborne ............. G06F 9/44547
717/106
6,229,809 B1 * 5/2001 Murphy .................. H04L 29/06
370/401
(Continued)

FOREIGN PATENT DOCUMENTS

JP 2008017301 A 1/2008
JP 2009529266 A 8/2009
(Continued)

OTHER PUBLICATIONS

Till Ballendat et al. "Proxemic interaction", Proc. of ITS 2010: Displays, ACM, Saarbrücken, Germany, Nov. 7, 2010 (Nov. 7, 2010), pp. 121-130, XP058104859.
(Continued)

*Primary Examiner* — Frantz Coby
(74) *Attorney, Agent, or Firm* — Leydig, Voit & Mayer, Ltd.

(57) ABSTRACT

A method for operating a network includes combining modules, which are lower-level service functions of the network, to compose a service, which is a higher-level service function of the network. At least two modules of the modules interact according to a policy for providing and/or monitoring and/or optimizing the service. The modules have an awareness, that includes a location-awareness and/or a proximity-awareness, with respect to at least one other module for deciding and/or varying: the amount and/or kind of interaction between the modules and/or the at least one other module; and/or a location of at least one of the at least one other module and/or the modules, at runtime depending on the awareness of a location and/or a proximity and on the policy.

20 Claims, 1 Drawing Sheet

(51) Int. Cl.
*H04W 64/00* (2009.01)
*H04W 4/02* (2018.01)
*H04L 29/08* (2006.01)
*H04N 19/40* (2014.01)
*H04L 12/26* (2006.01)

(52) U.S. Cl.
CPC .......... *H04L 41/5067* (2013.01); *H04L 43/08* (2013.01); *H04L 69/321* (2013.01); *H04N 19/40* (2014.11); *H04W 4/023* (2013.01); *H04W 64/003* (2013.01)

(58) Field of Classification Search
CPC ... H04L 41/5067; H04N 19/40; H04W 4/023; H04W 64/003
USPC ................................................. 709/223, 232
See application file for complete search history.

(56) References Cited

U.S. PATENT DOCUMENTS

| | | | | |
|---|---|---|---|---|
| 7,003,578 B2* | 2/2006 | Kanada | .................... | H04L 47/10 709/223 |
| 7,633,966 B2* | 12/2009 | Binder | .................... | H04B 3/542 370/463 |
| 7,636,365 B2* | 12/2009 | Chang | .................... | H04L 67/12 370/401 |
| 7,672,882 B2* | 3/2010 | Agarwal | .............. | G06Q 20/102 705/30 |
| 7,681,235 B2* | 3/2010 | Chesla | .................. | G06F 21/552 726/22 |
| 7,746,900 B2* | 6/2010 | Kim | .......................... | H04L 1/16 370/469 |
| 8,234,686 B2* | 7/2012 | Alvermann | ............. | G06F 21/72 380/270 |
| 8,532,978 B1* | 9/2013 | Turner | .................. | G06F 40/211 704/9 |
| 8,831,821 B2* | 9/2014 | Downs, Jr. | ............. | H04L 67/12 701/33.7 |
| 9,215,214 B2* | 12/2015 | Bansal | ................ | H04L 63/0263 |
| 9,246,945 B2* | 1/2016 | Chari | ..................... | H04L 63/20 |
| 9,372,973 B2* | 6/2016 | Giambiagi | .............. | G06F 21/31 |
| 9,379,756 B2* | 6/2016 | Altman | ................ | H04W 8/183 |
| 9,461,886 B2* | 10/2016 | Racz | .................... | H04L 41/044 |
| 9,608,997 B2* | 3/2017 | Nicodemus | ........... | H04L 63/102 |
| 2002/0085591 A1* | 7/2002 | Mesh | ...................... | H04L 29/06 370/535 |
| 2004/0122967 A1* | 6/2004 | Bressler | .................. | H04L 47/10 709/232 |
| 2005/0033972 A1* | 2/2005 | Watson | ................... | G06F 21/10 713/189 |
| 2005/0129035 A1* | 6/2005 | Saito | ....................... | H04L 41/50 370/401 |
| 2007/0011272 A1* | 1/2007 | Bakke | ................... | G06F 9/5027 709/217 |
| 2007/0092197 A1* | 4/2007 | Mitchell | ............. | H04J 14/0227 385/140 |
| 2011/0170412 A1 | 7/2011 | Ramadas et al. | | |
| 2013/0283336 A1* | 10/2013 | Macy | ..................... | G06F 21/577 726/1 |
| 2014/0317684 A1* | 10/2014 | Porras | ..................... | H04L 63/20 726/1 |
| 2015/0082308 A1 | 3/2015 | Kiess et al. | | |
| 2015/0269383 A1 | 9/2015 | Lang et al. | | |
| 2015/0364128 A1* | 12/2015 | Zhao | .................... | G06N 3/0445 704/259 |
| 2016/0135175 A1* | 5/2016 | Tarlazzi | ................ | H04W 28/08 370/329 |
| 2017/0187750 A1* | 6/2017 | Zhang | ................. | G06F 16/9027 |
| 2017/0272523 A1* | 9/2017 | Cillis | .................... | H04L 41/082 |

FOREIGN PATENT DOCUMENTS

| | | |
|---|---|---|
| JP | 4990920 B2 | 8/2012 |
| JP | 2015056182 A | 3/2015 |
| WO | WO 2009092586 A1 | 7/2009 |

OTHER PUBLICATIONS

INTEL: "Discussion Paper on ETSI Mobile-Edge Computing (MEC) and its Relevance to 3GPP Multimedia Services", 3GPP Draft; S4-150757_ETSI_MEC_USE_CASES, 3rd Generation Partnership Project (3GPP), Mobile Competence Centre; 650, Route des Lucioles; F-06921 Sophia-Antipolis Cedex; France, vol. SA WG4, No. Rennes, France; Jul. 6, 2015-Jul. 10, 2015, Jun. 30, 2015 (Jun. 30, 2015), XP050987072.

* cited by examiner

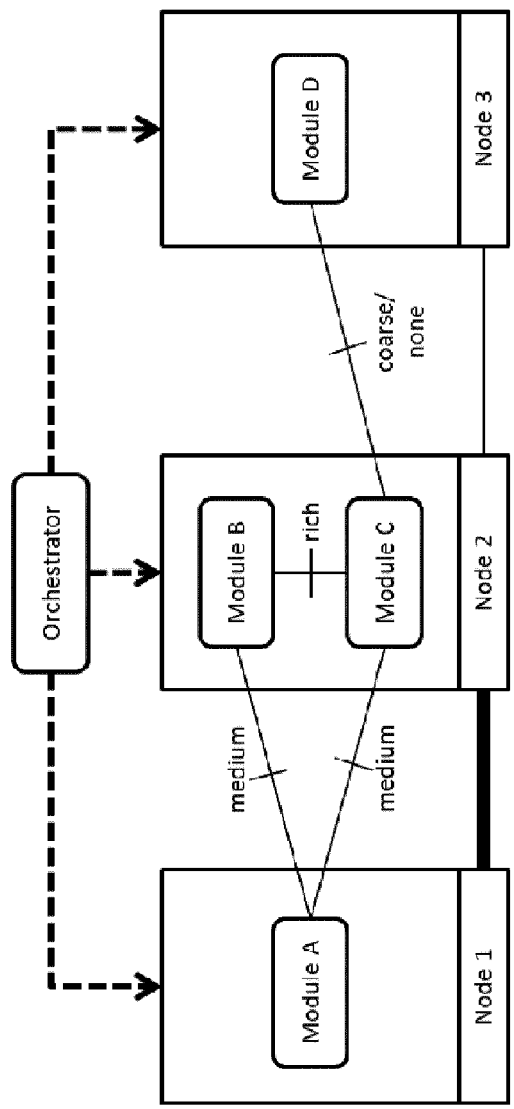

SYSTEM AND METHOD FOR OPERATING A NETWORK

CROSS-REFERENCE TO RELATED APPLICATIONS

This application is a U.S. National Stage Application under 35 U.S.C. § 371 of International Application No. PCT/EP2016/050293 filed on Jan. 8, 2016. The International Application was published in English on Jul. 13, 2017 as WO 2017/118488 A1 under PCT Article 21(2).

FIELD

The present invention relates to a method and system for operating a network.

BACKGROUND

A considerable attention has recently been devoted to "Service Function Chaining" in the context of carrier networks. The idea is to compose higher-level services by combining—"chaining"—lower-level service functions. An example would be a video distribution service that chains— starting from the user side—a parental control function, a video transcoding function and a cache. Adding general network service functions such as NAT, Network Address Translation, or firewall leads to a larger Service Function Chain.

Evidently, these service functions are quite isolated from one another, interacting only via the data plane of traffic that passes through them in a row. Generally, however, functions may interact more closely. In the Service Oriented Architecture space, this has been proposed already for quite some time. There, services expose a public API, Application Programming Interface, which can be invoked by other— web—services. Orchestration languages such as BPEL, Business Process Execution Language, then compose higher-level services by defining the sequence and control logic in and with which the individual web services are invoked. For the sake of this invention, we refer to the lower-level services as "modules". These can be composed into higher-level services, which we simply call "service" from now on.

One of the benefits of such modular services is that individual modules can be independently scaled and relocated to different physical machines in the infrastructure. This means that modules can be collocated on the same physical machines, but they could also be separated by a local or even wide-area network. If two or more modules of a service interact while being physically separated, the interaction has to be enabled via network communications, e.g. Remote Procedure Calls, RPCs, or Representational State Transfer, REST, calls. Clearly, the performance of the overall service will be affected, if modules interact heavily over a high-latency or congested network. However, at service compile time, the service developer is not—and does not want to be—aware of the final placement of modules in the infrastructure and thus cannot design his service in a way that makes a reasonable trade-off between module interaction granularity—leading to enriched service quality—and inter-module communication performance. Therefore, he either has to assume that modules are collocated, which allows rich interactions between modules, or that modules are "somehow" physically separated, which would constrain the amount of interactivity between modules. What is worse, it is not even possible, to know the module placement before the actual deployment, as the very idea of Service Oriented Architectures, microservices or Service Function Chaining is that modules can be relocated at runtime. This means that, what was once a low-latency local socket connection can easily turn into a high-delay wide-area network connection during service lifetime.

Three examples of Service Function Chaining are explained in the following:

EXAMPLE 1

A VoIP server VNF, Virtual Network Function, provides an API to expose packet loss, loss of consecutive packets and used codec per session. A monitoring VNF, e.g. Nagios, provides an API to expose latency and jitter measurements along a certain path. A VoIP control app accesses the VoIP server VNF and monitoring VNF to calculate a Mean Opinion Score, MOS, for the different VoIP sessions. Depending on how close the VoIP control app is to VoIP server and probe, it will either ask for only limited KPIs, Key Performance Indicators, ignoring the other ones, e.g. packet loss KPI from server and latency from Nagios, leading to a rather rough MOS approximation, or it will adapt its polling frequency, e.g. between 1/s to 1/min, or it will ask for all KPIs to get a much more expressive MOS calculation.

EXAMPLE 2

In case RAN, Radio Access Network, Controller VNF and Backhaul Controller VNF—doesn't have to be controllers for the entire RAN/BH, but rather regional controllers—are far apart, they inter-operate based on load thresholds, i.e. only once something needs to urgently be done—a specific RAN cell congested, or backhaul congested—, they talk to each other to find joint solution. And even then, they might only exchange aggregate load KPIs for the affected RAN sites. In the other extreme, they may run a continuous and complex negotiation to decide which UEs, User Equipments, to hand over to another site, how to change antenna tilts, eNB power levels, etc. or how to re-route or re-dimension tunnels in the backhaul to reach optimal per-UE end-to-end performance.

EXAMPLE 3

A set of probe VNFs in different parts of the network clones random packets from the respective data planes and sends them to an IDS, Intelligent Decision System, system or analytics engine. Depending on how close probe and IDS VNF are, the sampling rate of the actual data sessions may vary and with it the accuracy of the IDS.

As recognized by the inventors, known methods for operating a network and corresponding networks using Service Function Chaining show deficiencies in flexibility and efficiency.

SUMMARY

An embodiment of the present invention provides a method for operating a network that includes combining modules, which are lower-level service functions of the network, to compose a service, which is a higher-level service function of the network. At least two modules of the modules interact according to a policy for providing and/or monitoring and/or optimizing the service. The modules have an awareness, that includes a location-awareness and/or a proximity-awareness, with respect to at least one other module for deciding and/or varying: an amount and/or kind of interaction between the modules and/or the at least one other module; and/or a location of at least one of the at least one other module and/or the modules, at runtime depending on the awareness of a location and/or a proximity and on the policy.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a diagram of a network structure according to an embodiment of the present invention.

DETAILED DESCRIPTION

Embodiments of the present invention improve the operation of a network and provide a corresponding network for enhancing efficiency and flexibility in a simple and secure way.

In accordance with embodiments of the invention, a improved method for operating a network is provided, having a higher-level service function (a service) that is composed by combining lower-level service functions (modules) of the network. At least two modules interact according to a policy for providing and/or monitoring and/or optimizing the service, and the modules are location-aware and/or proximity-aware with respect to at least one other module for deciding and/or varying: the amount and/or kind of interaction between modules and/or a location of at least one module at runtime depending on such an awareness of location and/or proximity and on the policy.

Further, according to embodiments of the invention an improved network is provided, where a higher-level service function (a service) is composed by combining lower-level service functions (modules) of the network. At least two modules are designed for interacting according to a policy for providing and/or monitoring and/or optimizing the service, and the modules are location-aware and/or proximity-aware with respect to at least one other module for deciding and/or varying: the amount and/or kind of interaction between modules and/or a location of at least one module at runtime depending on such an awareness of location and/or proximity and on the policy.

Further, an orchestrator for use within the above method is provided, the orchestrator being designed for providing awareness to the modules The orchestrator is aware of individual operating points of the various modules and wherein the orchestrator places the modules based on the individual operating points within the network.

According to the invention, it is possible to provide a very efficient and flexible method for operating a network using Service Function Chaining by modules which are location-aware and/or proximity-aware with respect to at least one other module. This awareness can be used for deciding and/or varying at runtime the amount and/or kind of interaction between modules and/or for deciding and/or varying a location of at least one module. Close modules can choose rich interactions between each other, while far apart modules can choose coarse grained interaction or even none at all. Such a deciding and/or varying depends on location and/or proximity and on the policy.

Thus, efficiency and flexibility of operating a network is enhanced in a simple and secure way by simply providing the modules location-aware and/or proximity-aware with respect to at least one other module.

According to an embodiment of the invention, the awareness can be enabled or provided by an underlying middleware, can be part of a hypervisor layer, or can be obtained by the modules themselves via latency or inter-module measurements. Generally, the way how modules obtain location- or proximity-awareness can depend on the software ecosystem.

According to a further embodiment, awareness can be given or provided to the modules by an orchestrator or service orchestrator function. Such an orchestrator or service orchestrator function provides an efficient and flexible management of the modules and the location- and/or proximity-awareness of the modules.

Within a further embodiment, awareness can be transmitted to the modules via an API primitive of a respective module. This embodiment provides a very simple and secure transmission of awareness to the modules.

According to a further embodiment location or proximity information can be expressed in terms of metrics. However, there are also other possibilities in expressing location or proximity information.

Within a further embodiment, proximity information can be expressed in terms of latency between modules, in number of hops or in network bandwidth. There are different suitable possibilities in expressing location or proximity information for use within the claimed method and network.

According to a further embodiment, the service can be a Mobile Edge Computing, MEC, application.

Within a further embodiment, a module can be a RAN-aware video transcoding module running on an MEC node. Such a module can have access to the local RAN information via a MEC interface.

According to a further embodiment, an orchestrator or service orchestrator function can be aware of individual operating points of the various modules. An operating point can be defined as a dependency declaration between inter-module proximity and a "benefit metric" that is to capture the impact of the given proximity on the possible module performance quality which in turn is determined by the granularity of interaction between modules.

Within a further embodiment, the modules can adapt their operating point based on the location and/or proximity with respect to at least one other module. A module can maintain its operating point within a storage.

According to a further embodiment, the adaptation can be achieved by the modules via a State Pattern and via maintaining a state machine for their various operating points, wherein depending on the proximity of a module to another module or other modules the module-internal state machine can be updated.

Within a further embodiment a module can implement a predefined action depending on its internal state. Such an action can be obtaining certain RAN information.

According to a further embodiment an interaction between modules can be enabled via network communication in a suitable way which can depend on the individual application or field of application.

Embodiments of the present invention provide a method and system or network where modules in a service graph can be made proximity-aware and can use this proximity information to adapt their operating point, i.e. the amount and/or granularity of network communication with neighboring modules in the service graph.

According to embodiments of the method and network a specification of the service graph can be possible where links between modules principally show interaction dependencies. Such a specification can expose different operating points, i.e. "benefit metrics" depending on a given "proximity metric", so that an orchestrator can make paretooptimal decisions on module placement, for example. Such an orchestrator can take the different operating points in the service graph into account when making placement decisions.

Within a further embodiment the orchestrator can place modules across the physical infrastructure of the network. Further, the modules can understand their proximities to their various neighbors in the service graph. Based on the determined proximity values the modules can adapt their operating point.

Within state of the art systems, the granularity of communication interactivity has to be fixed at service design time. Within embodiments of the present invention, this granularity can be dynamically changed during runtime. This is highly relevant in the era of Network Function Virtualization("NFV"), where virtual modules ("VNFs") can be dynamically relocated at runtime.

There are several ways how to design and further develop the teaching of the present invention in an advantageous way. To this end it is to be referred to the following explanation of examples of embodiments of the invention, illustrated by the drawing.

Within embodiments of this invention, modules are made location-aware and/or proximity-aware with respect to another module and use this awareness to decide and possibly vary at runtime the amount of interaction between modules. Close modules would choose rich interactions with many RPCs between each other, while far apart modules would choose coarse grained interaction or even none at all. In order to fulfill their own job, in the absence of interaction with neighboring modules in the dependency graph, modules would have to resort to autonomous behavior based on own measurements, estimations about context variables—which other modules could have provided accurately if they were closer, and so on. Rich versus coarse interaction, according to this invention, can vary during runtime of a service depending on the varying module placement.

In a practical deployment or embodiment, the way how modules obtain location- or proximity-awareness depends on the software ecosystem. Such awareness could be enabled, for instance, by an underlying middleware, such as CORBA and successors, it could be part of the hypervisor layer, such as the Java VM in case of Java Remote Method Invocation, it could be obtained by the modules themselves via latency or other inter-module measurements, it could also be given to the modules by a service orchestrator function, in ETSI NFV architecture, the NFVO, NFV Orchestrator, would give this instruction via the VNFM, VNF Manager. This invention does not place any restrictions on the exact method of obtaining this awareness, but for the sake of explanation, we will assume in the following that awareness is generated and signaled to modules by the orchestrator. Location or proximity information can be expressed in terms of different metrics. Proximity can be expressed in terms of latency between modules. It could also be expressed in number of hops, or network bandwidth, or other metrics.

In FIG. 1, Modules B and C are collocated. Since they are aware of this fact by means of a notification from the orchestrator, e.g. via a dedicated API primitive of each module, they will use a rich collaboration mode, potentially involving many RPCs. While both modules B and C also have interaction dependencies with module A, interaction will likely be coarser, because module A is located on a different physical machine, namely Node 1, albeit via a high-speed network connection. Since modules C and D are connected via a low-speed network connection, they will likely choose an even coarser interaction granularity, or they may have no RPC interaction whatever, resulting in a pure data plane forwarding relationship.

An example for use with an embodiment of the invention is a Mobile Edge Computing("MEC") application such as a RAN-aware video transcoding module. If this module runs on an MEC node, it will have access to the local RAN information via the MEC interface. If the orchestrator decides to place it further away from the RAN, e.g. in an aggregation network compute node, the transcoding module will generally have either limited access to the remote MEC interface—there are proposals by some vendors to disseminate limited RAN information further into the aggregation network, or it will have to do some RAN measurement on its own—such as app-level delay monitoring—or resort to RAN-agnostic methods such as accessing local TCP stack information. From this example, it can be clearly seen how proximity between modules—here the transcoding module and the MEC "module"—leads to different operating points, i.e. different granularities of interactions.

In order for an orchestrator to make informed module placement decisions, it needs to be aware of the different operating points of the various modules. An operating point in this context is defined as a dependency declaration between inter-module proximity and a "benefit metric" that is to capture the impact of the given proximity on the possible module performance quality—which in turn is determined by the granularity of interaction between modules. Hence, in the service graph—i.e. the service specification that is handed over to the orchestrator for service execution—, these operating points must be clearly exposed for each link between modules.

Being location- or proximity-aware in itself is not enough. Modules also need to be able to act on this information, i.e. adapt to it. As one embodiment, this can be achieved via a so-called State Pattern, see https://en.wikipedia.org/wiki/State_pattern. This means that modules maintain a state machine for their various operating points. Depending on a module's proximity to other neighboring modules in the service graph, the module-internal state machine is updated. Modules will then implement specific actions—such as obtaining certain RAN information in the example above—differently depending on their internal state.

Embodiments of the present invention provide for enhancing the efficiency and flexibility of operating a network in a simple and secure way. As described above, a higher-level service function (a service) is composed by combining lower-level service functions (modules) of the network. At least two modules interact according to a policy for providing and/or monitoring and/or optimizing the service, and the modules are location-aware and/or proximity-aware with respect to at least one other module for deciding and/or varying the amount and/or kind of interaction between modules and/or a location of at least one module at runtime depending on such an awareness of location and/or proximity and on the policy.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a network, the method comprising:
   combining modules, which are lower-level service functions of the network, to compose a service, which is a higher-level service function of the network,
   wherein at least two modules of the modules interact according to a policy for providing and/or monitoring and/or optimizing the service, and
   wherein the at least two modules have an awareness, comprising a location-awareness and/or a proximity-awareness, with respect to at least one other module of the modules for deciding and/or varying an amount and/or kind of interaction between the at least two modules and/or between the at least one other module at runtime depending on the awareness and on the policy.

2. The method according to claim 1, wherein the awareness is enabled or provided by an underlying middleware, is part of a hypervisor layer, or is obtained by the modules via latency or inter-module measurements.

3. The method according to claim 1, wherein the awareness is provided to the modules by an orchestrator or a service orchestrator function.

4. The method according to claim 1, wherein the awareness is transmitted to the modules via an API primitive of a respective one of the modules.

5. The method according to claim 1, wherein location and/or proximity information is expressed in terms of metrics.

6. The method according to claim 1, wherein proximity information is expressed in terms of latency between the modules, in number of hops, or in network bandwidth.

7. The method according to claim 1, wherein the service is a Mobile Edge Computing ("MEC") application.

8. The method according to claim 1, wherein a module of the modules is a RAN-aware video transcoding module running on an MEC node.

9. The method according to claim 1, wherein an orchestrator or service orchestrator function is aware of individual operating points of the modules, each of the operating points corresponding to an amount and/or granularity of network communication of a corresponding one of the modules with neighboring modules.

10. The method according to claim 1, wherein the modules adapt their operating point based on the location-awareness and/or the proximity-awareness with respect to at the least one other module, the operating point corresponding to an amount and/or granularity of network communication of a corresponding one of the modules with neighboring modules.

11. The method according to claim 10,
   wherein the adaptation is achieved by the modules via a State Pattern and maintaining a state machine for the modules' operating points, and
   wherein depending on the proximity of a module of the modules to another module or other modules, the module's internal state machine is updated.

12. The method according to claim 1, wherein depending on its internal state a module of the modules implements a predefined action.

13. The method according to claim 1, wherein an interaction between the modules is enabled via network communication.

14. A network comprising:
   a service that is a higher-level service function and is composed based on the combination of modules that are lower-level service functions of the network,
   wherein at least two modules of the modules are configured to interact according to a policy for providing and/or monitoring and/or optimizing the service, and
   wherein the at least two modules have an awareness, comprising a location-awareness and/or a proximity-awareness with respect to at least one other module of the modules for deciding and/or varying an amount and/or kind of interaction between the at least two modules and/or between the at least one other module at runtime depending on the awareness on the policy.

15. An orchestrator for use within the method according to claim 1,
   wherein the orchestrator is configured to provide the awareness to the modules,
   wherein the orchestrator is configured to be aware of individual operating points of the modules, each of the operating points corresponding to an amount and/or granularity of network communication of a corresponding one of the modules with neighboring modules, and
   wherein the orchestrator places the modules, based on the individual operating points, within the network.

16. The method of claim 1, wherein the modules interact only via a data plane of traffic that passes through them in a row.

17. The method of claim 1, the method further comprising varying at runtime, based on the awareness and the policy, the kind of interaction between the at least two modules or between the at least two modules and the at least one other module.

18. The method of claim 17, wherein varying the kind of interaction comprises at least one of: changing an interaction from the at least one other module to a different other module, selecting a rich interaction to the at least one other module, selecting a coarse grained interaction to the at least one module, or updating a state machine.

19. The network of claim 14,
wherein the at least two modules are configured to vary at runtime, based on the awareness and the policy, the kind of interaction between the at least two modules or between the at least two modules and the at least one other module, or
wherein the network comprises an orchestrator that is configured to vary at runtime, based on the awareness and the policy, the kind of interaction between the at least two modules or between the at least two modules and the at least one other module.

20. The method of claim 1, the method further comprising varying at runtime, based on the awareness and the policy, the location of a location of at least one of the at least one other module and/or the modules.

* * * * *